July 8, 1952  W. A. WHITING  2,602,469
REINFORCED CONCRETE PIPE
Filed Nov. 4, 1946  2 SHEETS—SHEET 1

INVENTOR
William A. Whiting
BY
Mellin + Hanscom
ATTORNEYS

July 8, 1952  W. A. WHITING  2,602,469
REINFORCED CONCRETE PIPE
Filed Nov. 4, 1946  2 SHEETS—SHEET 2
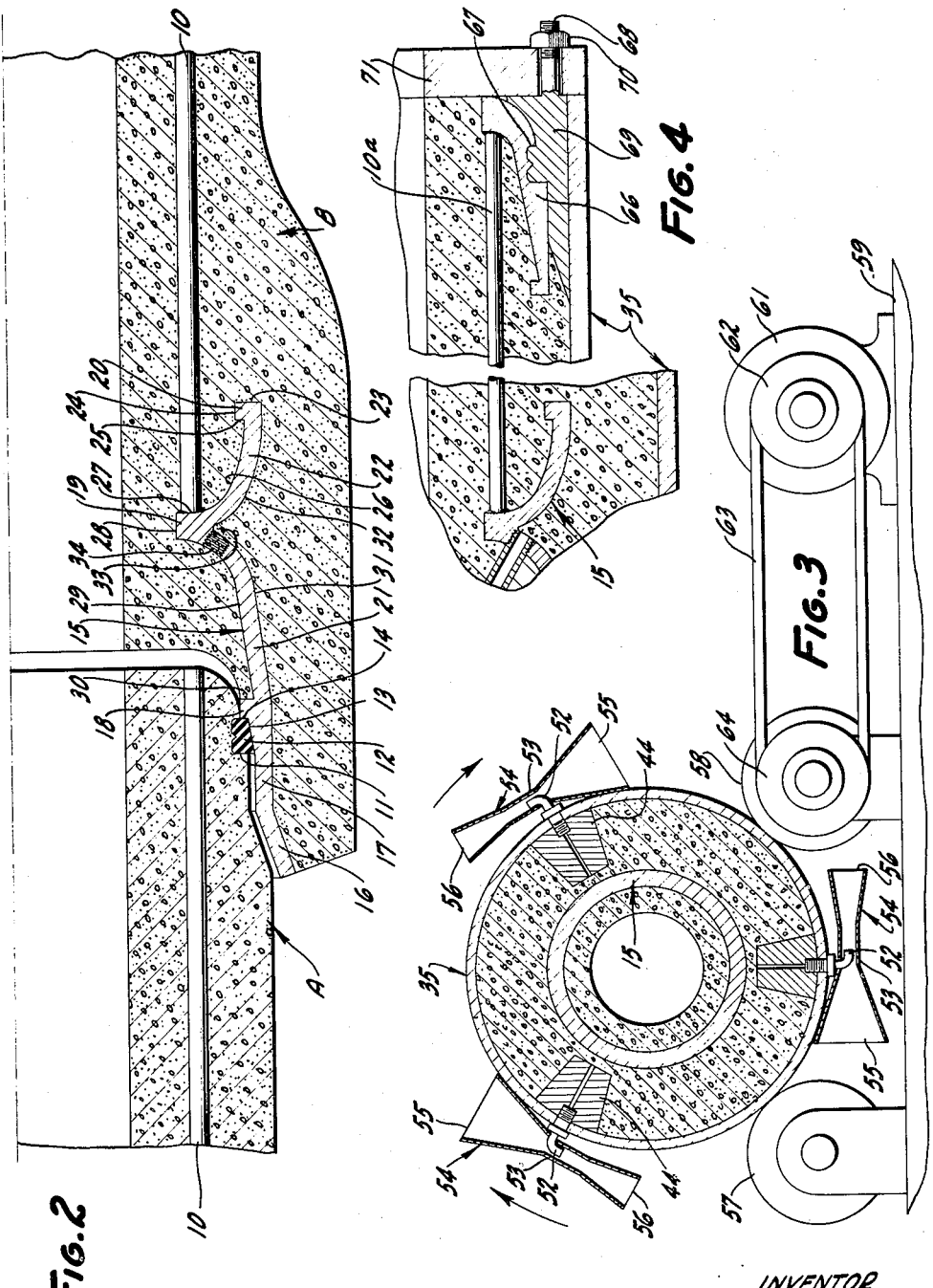
INVENTOR
William A. Whiting
BY
Mellin & Hanscom
ATTORNEYS Patented July 8, 1952

2,602,469

UNITED STATES PATENT OFFICE 2,602,469

REINFORCED CONCRETE PIPE

William A. Whiting, Long Beach, Calif., assignor to American Pipe and Construction Co., Los Angeles, Calif., a corporation of Delaware Application November 4, 1946, Serial No. 707,668

7 Claims. (Cl. 138—84)

The present invention relates to pipes composed predominantly of concrete or other cementitious materials.

As is well known, cement or concrete has a much greater strength in compression than in tension. In concrete pipe having bell and spigot ends, the spigot portion is ordinarily in compression while the bell portion is in tension. Accordingly, it oftentimes becomes necessary to provide metal reinforcements in the bell portion to obtain sufficient strength for withstanding the tensile and bursting stresses to which it is subjected.

The obtaining of a leakproof or impervious pipe section embodying a metal or ring-shaped reinforcing band has been difficult, because of the formation of a poor bond between the band and concrete. This is true of centrifugally cast pipe, in which air and excess water are forced to the inner surface of the pipe for withdrawal. When it is desired to provide concrete around the metal band portion of the bell end of the pipe, the air and water are entrapped between the outer surface of the band and the concrete, producing a space after the concrete has set and hardened through which liquid flowing through the pipe can escape to its exterior.

Entrapment of the excess air and water also reduces the unit strength of the cementitious mass, requiring a compensating increase in the diameter and thickness of the bell end of the pipe to obtain adequate total strength, at an attendant substantial increase in the quantity of materials used and cost of production.

Accordingly, it becomes an object of the present invention to provide a reinforced concrete pipe structure in which a good bond is obtained between the reinforcement and the cemetitious material, thereby precluding leakage of fluid along the reinforcement and through the pipe wall.

A further object of the invention is to provide a bell and spigot reinforced concrete pipe construction in which the hardened concrete has high unit strength, enabling the employment of smaller diameter bell ends capable of withstanding relatively high transverse tensile and bursting stresses.

Another object of the invention is to provide a reinforcing band in concrete pipe of such shape as to permit the withdrawal of entrapped air and water during production of the pipe, thus providing a dense, compact concrete structure throughout the entire pipe section, and particularly in the region of its contact with the reinforcing band.

Another object of the invention is to provide pre-stressed or tensioned reinforcements in a concrete pipe section which is so disposed as to insure that the concrete will be dense and compact following its setting and hardening.

Yet a further object of the invention is to provide a method of forming a reinforced concrete pipe which assures the production of a compact, comparatively air and water-free concrete mass on the exterior of a reinforcing band, as well as on its interior.

Still another object of the invention resides in the provision of a method for centrifugally casting concrete pipe, which permits the entire pipe section to be substantially completed while in the centrifugal apparatus, very little finishing being required subsequent to performance of the centrifugal operation.

The invention is exemplified in the following description and illustrated by way of example in the accompanying drawings, in which:

Fig. 2 is a partial longitudinal section through the mating bell and spigot portions of adjacent pipe sections.

Fig. 3 is a transverse section through an apparatus for centrifugally casting concrete pipe sections.

Fig. 4 is a view similar to Fig. 1 of a modified form of centrifugally cast reinforced concrete pipe, positioned within the casting apparatus.

Figure 1:
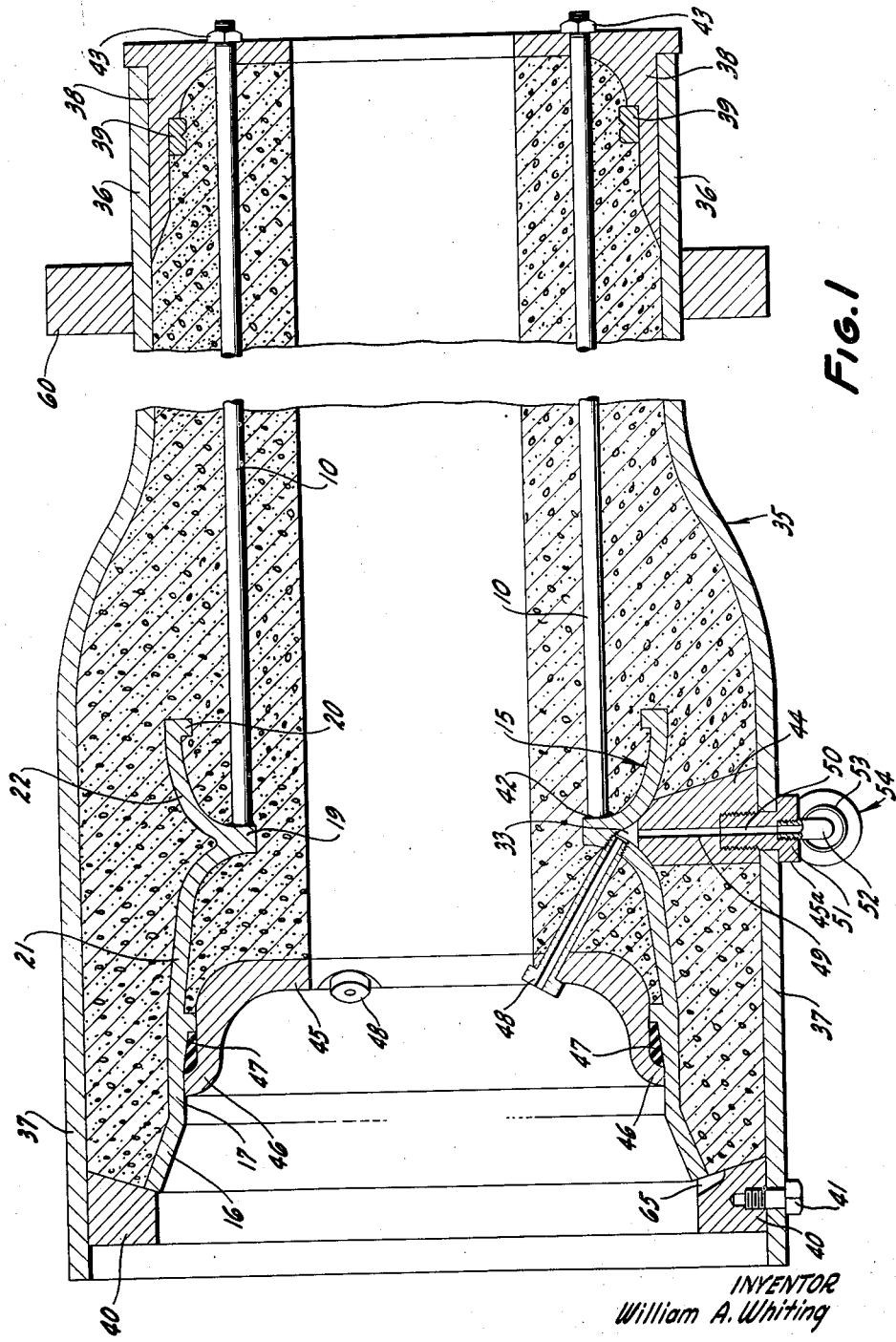
Fig. 1 is a longitudinal section through a pipe section preparatory to its removal from a form in which it has been centrifugally cast.

A bell and spigot joint is disclosed in Fig. 2, wherein the spigot end A of one pipe section is inserted into the bell portion B of an adjacent pipe section. Each pipe section is formed predominantly of concrete and has pre-tensioned or pre-stressed reinforcing rods 10 running longitudinally therethrough.

As described in my Patent 2,477,533 for "Pipe Joint," a groove 11 is provided in the periphery of the spigot, containing a gasket 12 adapted to seal against an inclined or tapered surface 13 and shoulder 14 in the bell portion of the adjacent pipe section, and more particularly in its reinforcing bell band 15.

The bell band has an outer tapered guiding portion 16 diverging toward its free end and merging into a generally cylindrical portion 17 of a larger internal diameter than the adjacent end of the spigot. The inner end of the cylindrical surface merges into the tapered or frustoconical wedge face 13 converging inwardly of the pipe or conduit toward its axis, and providing a sealing surface for the gasket 12. The small diameter end of this tapered sealing surface 13 terminates in the internal shoulder 14 formed by an outer, inwardly projecting flange 18 on the bell band 15.

From the outer flange 18, the bell band converges inwardly toward an intermediate internal flange 19, from which it diverges longitudinally of the pipe to an inner inwardly projecting flange 20. The converging and diverging portions 21, 22 of the band provide relatively high strength in the steel reinforcing band and insure removal of entrapped air and water during the centrifugal casting of the pipe in a moulding machine. Removal of the excess, undesired fluent substances results from the shape of the bell band portions 21, 22. The end shoulder 23 on the inner flange 20 is at right angles to or is inclined slightly toward the intermediate flange 19, intersecting a flat or slightly rounded surface 24 on the inner face of the inner flange. The other shoulder 25 of the inner flange is also formed substantially at right angles to the axis of the pipe or inclined slightly thereto. The inner face 26 of the inner portion 22 of the band converges inwardly in curved fashion from the inner flange 20 toward the intermediate flange 19, merging into a shoulder 27 on one side of the intermediate flange 19 substantially at right angles to the conduit axis.

The intermediate flange shoulder 27 intersects an inner flange surface 28 substantially parallel to the pipe axis, which surface, however, may be formed slightly curved or convex. The inner surface 29 of the outer bell band portion 21 between the intermediate and outer flanges 19, 18 is curved outwardly to provide a divergent surface running from the flange surface 28 to a shoulder 30 on the outer flange 18.

The outer faces 31, 32 of the band are generally parallel to the inner faces 29, 26 and taper inwardly toward one another to form a groove or channel-shaped pocket 33 whose purpose will be later explained. A plurality of holes 34 are provided in the outer band portion 21 in communication with the annular pocket 33, to enable the drainage or evacuation of entrapped air and water therefrom.

The centrifugal casting of the above described reinforced concrete pipe section is illustrated in Figs. 1 and 3. A pipe form 35 is provided with the general external shape of the pipe section desired. One end 36 is smaller in diameter than the other end 37 to provide the spigot and bell ends, respectively, of the pipe section. The spigot end of the form carries an end ring or sleeve 38 extending into the outer form member 35 and internally shaped to provide the required complemental exterior on the spigot end of the pipe. An elastic filler ring 39 is placed in the end ring to shape the gasket groove 11 in the spigot end upon introduction of concrete into the form.

The bell band 15 is inserted in proper position in the other end of the form. Its outer end engages a retainer ring 40 secured to the pipe form by screws 41 or the like. This retainer ring 40 prevents movement of the band in one longitudinal direction outwardly of the form. The band 15 is held and urged in the other longitudinal direction toward the end ring 38 by a plurality of circumferentially spaced tie rods or bolts 10 suitably secured to the intermediate band flange 19, as by welding material 42, and extending completely through the pipe form and through the end ring 38 where tension is applied to them by tightening nuts 43 threaded on their ends against the exterior of the end ring.

Longitudinal movement of the bell band 15 toward the end ring 38 is prevented by engagement of circularly spaced lugs or supporting abutments 44 with the outer faces 31, 32 of the band in the region of its groove 33. These supporting abutments are secured rigidly to the pipe form by bushings 45a extending through the forms and threaded into the abutments. It is apparent that tightening of the bolt nuts 43 to pre-tension the rods 10 cannot move the bell band 15, because of the restraint imposed by the rigid supporting abutments 44.

An end retainer ring 45 conforming to the desired end shape of the concrete within the bell band is inserted in place within the bell band 15. The inward position of this member is limited by engagement of its outer flange 46 with a filler gasket or ring 47 contacting the shoulder or flange 18 in the band. Its outward movement is prevented by a plurality of circularly spaced hollow bolts or tubes 48 inserted through and engaging the ring 45 and extending in an inclined direction outwardly of the axis of the pipe toward the bell band groove 33, where the hollow tubes are threaded into the band holes 34 communicating with the external peripheral band groove. It is apparent that with this arrangement the retainer ring 45 is prevented from moving out of the bell band 15, the latter, as aforementioned, being held in place by the supporting abutments 44 and the pre-stressed tie rods 10.

For the purpose of evacuating the bell band groove 33, a passage 49 may be formed through each supporting abutment 44, communicating with a passage 50 in each bushing 45a. A suction device is attached to the head 51 of each bushing, consisting of a tubular L-shaped member 52 threaded thereinto and communicating with the bushing passage 50. The member 52 extends into the throat portion 53 of a Venturi suction device 54 whose convergent inlet 55 can scoop air during rotation of the pipe form 35 and force it through the throat 53 and around the rearwardly facing outlet 56 of the L-shaped member, creating a suction effect in the member 52 capable of aspirating or evacuating fluent materials, such as air and water, from the groove 33, withdrawing them through the passageways 49, 50 into the venturi 54, from which they are discharged at its rearward end.

The assembly described is mounted on a suitable centrifugal casting apparatus which may include a pair of rollers 57, 58 mounted on a suitable base 59 and engaging spaced drive rings 60 on the exterior of the pipe form 35. One of the rollers 58 is rotated in order to frictionally drive the pipe form 35 and the entire mechanism at the proper speed. Rotary movement is imparted to the roller 58 by a suitable electric motor 61 and intervening driving pulley 62, belt 63 and driven pulley 64.

The assembled apparatus is placed on the roller supports and is rotated in a suitable direction, such as the clockwise direction illustrated in Fig. 3. Concrete is introduced in the interior of the apparatus by any suitable means, as by hand or by a trough feeder or screw conveyor (both not shown). Centrifugal force incident to rotation of the assembly forces the concrete or other cementitious mix in an outward direction to compact it against the pipe form 35 and against all other surfaces within the pipe form. Since it is necessary to employ an excess of water in the mixture to attain the necessary plasticity, such excess water and any entrapped air are forced inwardly, passing in a generally radial direction through the concrete mass in the form toward the axis of the pipe, appearing as a film of air and water on the inner surface of the concrete, from where it is removed by a suitable tool. The excess water and air are prevented from being entrapped on the exterior of the bell band 15 by reason of its tapered external surfaces 31, 32 which are inclined inwardly toward the collecting annular groove or channel 33 adjacent the intermediate flange 19. The air and water flow inwardly to the band 15 and along its exterior faces 31, 32 to the annular groove 33, from which they are removed by flowing through the evacuator tubes 48 attached to the retainer ring 45 or by reason of the suction or aspirating effect of the air forced through the Venturi nozzles 54, which create a suction effect in their throat portions 53 capable of pulling the air and water from the groove 33, through the passages 49, 50 and L-shaped members 52, for discharge from the Venturi outlet ends. Part of the excess fluent substances in the end portion of the concrete mass passes outwardly through the holes or notches 65 in the retainer ring 40.

Excess water and air in the concrete mass within the band 15 flows radially inward to the inner surface of the concrete pipe body. A portion of such flow proceeds along the inner faces 26, 29 of the bell band to the intermediate flange 19, from which it passes inwardly to the inner surface of the concrete mass.

After sufficient concrete has been placed in the form, the inner surface may be finished by troweling. Following the setting and hardening of the concrete, the nuts 43, screws 41, bushings 45a and evacuator tubes 48 may be unscrewed from the tie rods 10, retainer ring 40, abutments 44 and bell band 15, respectively, to permit the retainer rings 40, 45, end ring 38 and pipe form 35 to be removed from the cast concrete pipe. Thereafter, the tapered supporting abutments 44 may be moved laterally from their embedded positions in the concrete and the filler ring 39 expanded from the formed spigot gasket groove 11. The holes left by the hollow tubes 48 and supporting abutments 44 are then filled in with grout or neat cement.

It is to be noted that the curved inner face 29 between the outer flange 18 and intermediate flange 19 enables the water and entrapped air and slurry particles which might otherwise tend to collect and adhere to the interior of the bell band to drain toward the intermediate flange 19 and then move inwardly to the inner surface of the concrete. The inner face 26 of the other bell band portion 22 also provides a means along which drainage can take place to the intermediate flange 19. Not only do these curved portions provide for the drainage and collection of the undesired water, air and other fluent substances that might be present, but they collectively form the intermediate flange 19, which increases the section modulus of the band at a critical point without a corresponding increase in the weight of the steel or other material from which the band is made.

The space between the intermediate flange 19 and outer flange 18 is filled with concrete, providing an internal support for the bell band. This portion of the concrete terminates adjacent the inner end 30 of the outer flange 18 to avoid the presence of any feather edge in the concrete. The concrete on the exterior of the bell band makes a good seal therewith because of the removal of the excess air and water to the drainage groove 33, from which it is all evacuated. Unless some means for drainage were provided, all of the excess air and water would have to be removed either through the holes or notches 65 in the end retainer ring 40 or around the end 23 of the inner flange 20. This would be very difficult, if not impossible, of performance, and would result in entrapped air and water between the concrete and external faces 31, 32 of the bell band through which subsequent fluid leakage could occur. In addition, a large portion of the air and water in the concrete mass on the exterior of the band, and other fluent materials, would flow longitudinally along the exterior of the bell band to the inner flange 20, passing around the latter radially inward to the inner surface of the concrete mass. Such large concentration of undesired substances in the concrete mass adjacent the end 23 of the inner flange would result in a porous region through which liquids subsequently conducted through the pipe could flow. From this porous region, the liquids could pass through the undesired space along the bell band exterior to the outside of the pipe, resulting in an imperfect, leaky pipe section.

The shapes provided on the outer faces 31, 32 of the band, coupled with the drainage of the groove 33, obviate the need for migration of the water and air longitudinally of the bell band and around the inner flange 20 before it can escape radially to the interior of the pipe. Instead, air and water is removed through the groove 33, resulting in a dense and compact concrete structure on the exterior of the bell band, making a firm seal therewith and along which leakage cannot occur.

It has been found that the pre-tensioned tie rods 10 actually result in a much stronger pipe structure since they provide much greater compactness to the concrete during the casting operation. The compactness incident to the use of the pre-stressed or pre-tensioned tie rods places the concrete mass under compression and provides for much greater strength in the pipe section, as well as eliminating porosity in the concrete material itself.

In the form of invention disclosed in Fig. 4, the spigot end of the pipe section also has a band 66 cast therein provided with a metallic groove 67 for the gasket ring 12. This band 66 is placed in the form and has the tie rods 10a extending from the bell band 15 secured to it in any suitable manner, as by welding. The tie rods 10a are tensioned by bolts 68 secured to a ring 69 fitting within the gasket groove 67, the nuts 70 on the bolts being tightened against the end retainer member 71 to produce the necessary tension in the tie rods 10a. The concrete is introduced into the rotating form in the same manner as described in connection with the other embodiment, excess water and air escaping and being withdrawn in the manner heretofore described. The pre-stressed tie rods 10a hold the concrete between the bell and spigot bands 15, 66 in compression to insure an impervious concrete mass of much greater strength.

It is, therefore, apparent that reinforced concrete pipes and methods of producing the same have been provided which insure the deposition of a dense and compact concrete mass on the exterior of the reinforcing band or bands, thereby providing greater strength to the pipe section. Moreover, the concrete mass is in compression in view of the pre-stressed tie rods 10 or 10a placed in the concrete mass, which also add to the strength of the entire pipe section. It is further to be noted that the shape of the bell band 15 increases its strength, and insures drainage and removal of excess air and water from the plastic cement or concrete slurry, resulting in a good bond and seal between the concrete and the bell band and the production of a leak-proof pipe section.

While I have shown and described preferred embodiments of my invention, it is to be understood that various changes may be made therein by those skilled in the art without departing from the spirit of the invention as defined in the appended claims.

Having thus described my invention, what I claim and desire to secure by Letters Patent is:

1. A conduit, including a tubular body of cementitious material, a reinforcing band in said body having an outer face inclined inwardly of the body toward the longitudinal axis of said body, said band having passages therethrough at the region where its outer face is closest to the body axis.

2. A conduit, including a tubular body of cementitious material, a reinforcing band encased in said body and having an intermediate substantially radially inwardly projecting flange, said band comprising portions diverging in opposite longitudinal directions from said flange to provide an annular groove therebetween around said flange.

3. A conduit, including a tubular body of cementitious material, a reinforcing band encased in said body and having spaced outer, intermediate and inner substantially radially inwardly projecting flanges, said band comprising portions diverging in opposite longitudinal directions from said intermediate flange toward said outer and inner flanges, the cementitious body material extending along and inwardly of said band portions.

4. A conduit, including a tubular body of cementitious material, a reinforcing band in said body and having spaced outer, intermediate and inner substantially radially inwardly projecting flanges, said band having an inner sealing surface forward of said outer flange adapted for engagement by a seal ring, said band further comprising portions diverging in opposite longitudinal directions from said intermediate flange toward said outer and inner flanges, the cementitious body material extending substantially entirely along the exterior of said band and also along the interior of said band portions.

5. A conduit, including a tubular body of cementitious material, a reinforcing band encased in said body and having an intermediate substantially radially inwardly projecting flange, said band comprising portions diverging in opposite longitudinal directions from said flange to provide an annular groove therebetween around said flange, said band having passages therethrough communicating with said groove.

6. A conduit, including a tubular body of cementitious material, a reinforcing band encased in said body and having an intermediate substantially radially inwardly projecting flange, said band comprising portions diverging in opposite directions from said flange to provide an annular groove therebetween around said flange, and longitudinally extending tensioned reinforcing members embedded in said body and secured to said flange.

7. A conduit, including a tubular body of cementitious material, a reinforcing band encased in said body and having an intermediate substantially radially inwardly projecting flange, said band comprising portions diverging in opposite longitudinal directions from said flange, and reinforcing rods secured to the inwardly projecting flange and extending longitudinally of the conduit.

WILLIAM A. WHITING.

REFERENCES CITED

The following references are of record in the file of this patent:

UNITED STATES PATENTS

| Number | Name | Date |
|---|---|---|
| 958,043 | Stockley | May 17, 1910 |
| 2,044,178 | McMullin | June 16, 1936 |
| 2,081,313 | Ukropina | May 25, 1937 |
| 2,102,968 | Overvad | Dec. 21, 1937 |
| 2,216,896 | Trickey | Oct. 8, 1940 |
| 2,224,419 | Whitman | Dec. 10, 1940 |
| 2,236,107 | Miller et al. | Mar. 25, 1941 |
| 2,236,108 | Miller et al. | Mar. 25, 1941 |
| 2,296,560 | MacKinnon | Sept. 22, 1942 |
| 2,325,469 | Boissou | July 27, 1943 |
| 2,348,477 | Jenkins | May 9, 1944 |
| 2,470,009 | Wilhelm | May 10, 1949 |